July 20, 1965 A. E. FLANDERS 3,196,334
WATT-SECOND LIMITER CONTROL
Filed March 26, 1962
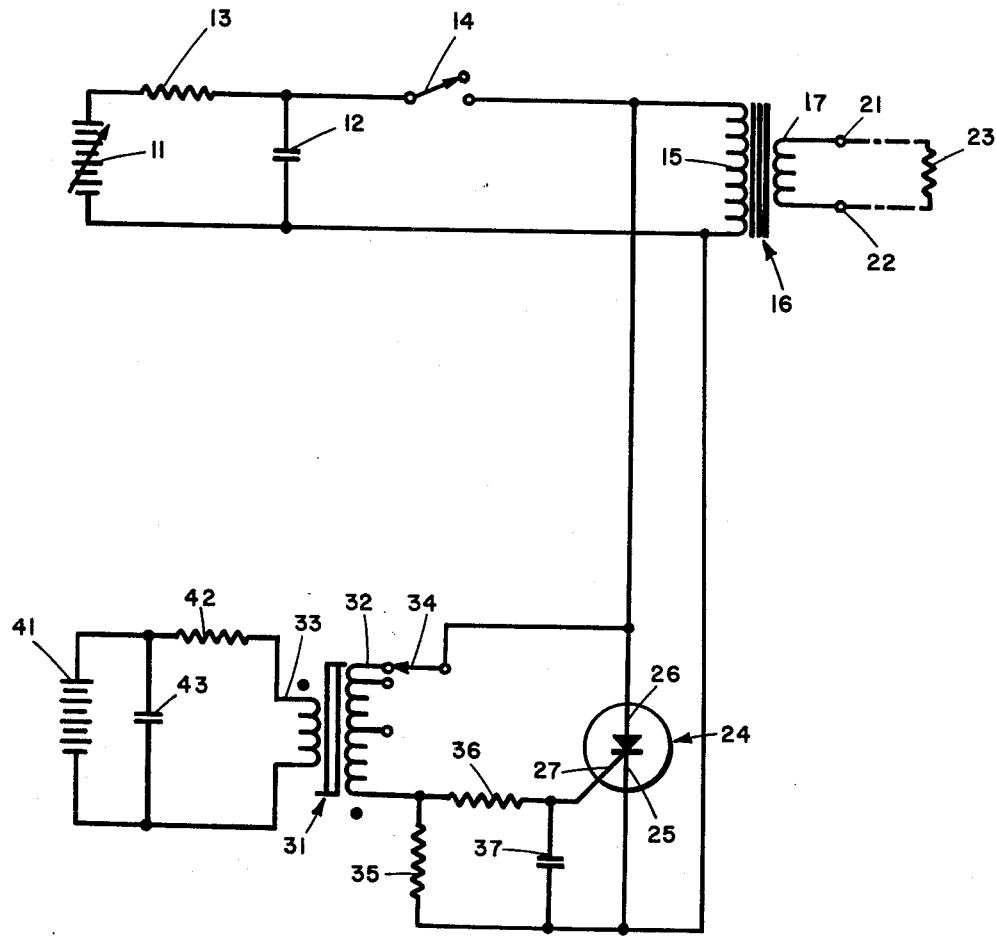
INVENTOR.
ANDREW E. FLANDERS
BY
ATTORNEY
AGENT

United States Patent Office 3,196,334
Patented July 20, 1965

3,196,334
WATT-SECOND LIMITER CONTROL
Andrew E. Flanders, Pomona, Calif., assignor to General Dynamics Corporation, San Diego, Calif., a corporation of Delaware
Filed Mar. 26, 1962, Ser. No. 182,468
3 Claims. (Cl. 320—1)

This invention relates to welding equipment, and more particularly, to a device for controlling the energy applied to effectuate a weld by a capacitor discharge resistance welder.

Many variables are present in the resistance welding process which may affect the quality of a welded joint. Exemplarily, but not exclusively, these variables include line voltage charges, capacitor aging, pulse transformer saturation creep, and other variables affecting the voltage applied to the weld, and weld resistance variables such as surface contamination, dimension tolerances, head pressure, electrode fouling, discharge contactor resistance, etc. As will be apparent, control of the energy supplied to the weld will eliminate the effect of these variables on the quality of the weld. The welding energy control device of the present invention monitors the volt-second energy of a weld pulse and controls the amount of area under the volt-second pulse curve by integrating voltage with respect to time. Instead of the usual logarithmic voltage fall, a steep fall time is enabled.

The energy discharge of a capacitor stored energy welder is monitored by a saturable reactor connected across the primary winding of the welding pulse transformer. A controlled rectifier is also connected across the primary of the welding pulse transformer. At a volt-time integral preset by the saturable reactor, the controlled rectifier is turned on, shorting out the welding pulse transformer primary and cutting off the welding pulse. Means are provided for resetting the saturable reactor at the termination of the pulse.

It is therefore, an object of this invention to provide a welding energy control device.

Another object of this invention is to provide a welding energy control device integrating voltage and time.

Another object of this invention is to provide a welding device employing a saturable reactor to control weld energy.

Another object of this invention is to provide a reliable welding energy control device which is simple to operate and inexpensive to manufacture.

These and other objects and advantages of the present invention will become apparent from the following specification and appended drawing, wherein the only figure depicts a schematic circuit diagram of one embodiment of this invention.

A conventional direct current capacitive stored energy welder is depicted in simplified form in the upper portion of the drawing. A variable direct voltage power source 11 is employed to charge energy storage capacitor 12 through current limiting resistor 13. A normally open contactor 14 closes a circuit between capacitor 12 and primary winding 15 of a pulse transformer 16. Transformer 16 is furnished with a secondary winding 17 connected to welder electrodes 21 and 22. The joint to be welded is shown schematically as load resistor 23.

Capacitor 12 is charged to the voltage of power supply 11 through resistor 13. Contactor 14 is closed, connecting capacitor 12 to primary 15 of welding transformer 16. When the circuit is closed, an impulse of welding current rises rapidly to its maximum value and exponentially decays to zero at a much slower rate.

The control circuit of the present invention cooperates with the basic capacitor stored energy welder discussed hereinabove. A silicon controlled rectifier 24 has a cathode 25, an anode 26, and a gate electrode 27. Anode 25 and cathode 26 are connected across primary winding 15 of welding pulse transformer 16. A saturable reactor 31 is provided with a tapped main winding 32 and a reset winding 33. Windings 32 and 33 are wound in opposite sense. A moveable tap switch 34, connected between winding 32 of saturable reactor 31 and the top end of primary winding 15 of welding pulse transformer 16, enables variation of the number of turns of winding 32 of saturable 31 connected in circuit. The low end of winding 32 of saturable reactor 31 is connected to cathode 25 of silicon controlled rectifier 24 and to the low end of primary winding 15 of welding pulse transformer 16 through a resistor 35. The low end of winding 32 of saturable reactor 31 is also connected to gate electrode 27 of controlled rectifier 24 through an RC filter circuit including resistor 36 and capacitor 37.

A reset circuit is connected to reset winding 33 of saturable reactor 31. A direct voltage source 41 is connected to reset winding 33 through resistor 42. A capacitor 43 is connected across voltage source 41.

In the normal, steady-state condition, capacitor 12 is charged to the voltage of D.C. power supply 11. Mechanical pressure is applied by the electrodes 21 and 22 to the workpiece represented by load 23, by a mechanism well-known to those skilled in the art. Upon application of the proper pressure, contactor 14 closes, discharging capacitor 12 into primary winding 15 of pulse transformer 16. Secondary winding 17 supplies a low voltage, high current pulse to the weld load 23 through electrodes 21 and 22. Pressure of the electrodes 21 and 22 on the weld may be varied during the current pulse in a manner well-known to the art.

It may be shown that the energy Q employed to heat the weld follows the equation $$Q = \frac{E^2 T}{R}$$

where E is the applied voltage, T is the time, and R is the load resistance of the weld reflected to primary winding 15 of transformer 16. The energy supplied by the capacitor 12 is also equal to Q, and may be expressed as $$Q = \frac{CE^2}{2}$$

A rectangular hysteresis loop magnetic material with a cross-sectional area A, for material exhibiting a maximum flux density $B_m$ wound with N turns has the voltage-time product relationship $ET = NAB_m \times 10^{-8}$. Since the entire right side of the equation is constant for a given coil, it will be apparent that $ET = K$, a constant. As discussed hereinabove, $$Q = \frac{E^2 T}{R}$$

and, substituting, $$Q = \frac{EK}{R}$$

However, taps selected by switch 34, are provided on winding 32 to enable presetting time T, and, therefore, Q to differing welding conditions. Over the normal range of weld resistances, pulse voltage varies directly as the weld load resistance varies. Thus, $Q = K^1 K$, or $Q = K^1 ET$. It can be seen, therefore that controlling E and T by means of saturable reactor 31 enables control of the quantity of heat energy applied to weld load resistor 23.

During the rise period of the welding current pulse, reflected as a rising voltage across winding 32 of saturable reactor 31, the saturable reactor integrates the voltage pulse with time. At the instant the predetermined voltage-time product is reached, reactor 31 saturates. The reactor impedance then drops to a low figure, and the voltage across resistor 35 increases, having a pulse form. This pulse is applied to gate electrode 27 of controlled rectifier 24 through the transient filter composed of resistor 36 and capacitor 37.

Controlled rectifier 24 is a semiconductor device with conduction characteristics similar to a thyratron. When cut off, it exhibits an extremely high resistance between anode 26 and cathode 25. Upon application of the voltage pulse across resistor 35 to gate electrode 27, the silicon controlled rectifier 24 rapidly switches to a conducting state wherein it exhibits a very low voltage drop and a high current-carrying ability, placing a virtual short circuit across energy storage capacitor 12 and allowing no further energy to be transferred to the weld load. Once conduction has been initiated, gate electrode 27 no longer has an effect. In order to turn silicon controlled rectifier 24 off, the anode-cathode current must be reduced to a value less than the holding current. Thus, when energy storage capacitor 12 has discharged sufficiently, silicon controlled rectifier 24 recovers to its non-conducting condition. Contactor 14 is opened, and energy storage capacitor 12 is recharged by power source 11. Since there is no voltage now present across winding 32 of saturable reactor 31, current from power supply 41 flowing through reset winding 33, wound in opposite sense from winding 32, applied a demagnetizing field to the core of saturable reactor 31 to reset the control for the following welding pulse.

Although a specific embodiment of this invention has been described hereinabove, it will be readily apparent to those skilled in the art that various changes in form and arrangement of parts can be made without departing from the spirit and scope of this invention as defined in the following claims.

I claim:
1. In a capacitor energy storage device, means for controlling the amount of energy discharged to a load comprising a saturable reactor having a winding connected to said load, a controlled rectifier having a cathode and an anode connected to said load, and a control terminal connected to said saturable reactor winding.

2. In a capacitor energy storage device, means for controlling the amount of energy discharged to a load comprising a saturable reactor having a winding connected to said load, a controlled rectifier having a cathode and an anode connected to said load, a control terminal connected to said saturable reactor winding, and reset means connected to said saturable reactor.

3. In a capacitor energy storage device, means for controlling the amount of energy discharged to a load comprising a saturable reactor having a first winding connected to said load, a second winding on said saturable reactor, a controlled rectifier having a cathode and an anode connected to said load and a control terminal connected to said first winding, and reset means connected to said second winding on said saturable reactor.

4. In a capacitor energy storage device, means for controlling the amount of energy discharged to a load comprising a saturable reactor having a first winding connected to said load, a second winding on said saturable reactor, a controlled rectifier having a cathode and an anode connected to said first winding, and a reset voltage source connected to said second winding on said saturable reactor.

5. In a capacitor energy storage device having a pulse transformer coupling a capacitor to a load, means for controlling the amount of energy discharged to said load comprising a saturable reactor having a winding connected across said pulse transformer, a controlled rectifier having a cathode and an anode connected across said pulse transformer and a control terminal connected to said saturable reactor winding.

6. In a capacitor energy storage device having a pulse transformer coupling a capacitor to a load, means for controlling the amount of energy discharged to said load comprising a saturable reactor having a first winding connected across said pulse transformer, a second winding on said saturable reactor, a controlled rectifier having a cathode and an anode connected across said pulse transformer and a control terminal connected to said first winding.

7. In a capacitor energy storage device having a pulse transformer coupling a capacitor to a load, means for controlling the amount of energy discharged to said load comprising a saturable reactor having a first winding connected across said pulse transformer, a second winding on said saturable reactor, a controlled rectifier having a cathode and an anode connected across said pulse transformer and a control terminal connected to said first winding, and reset means connected to said second winding.

8. In a capacitor energy storage device having a pulse transformer coupling a capacitor to a load, means for controlling the amount of energy discharged to said load comprising a saturable reactor having a first winding connected across said pulse transformer, a second winding on said saturable reactor, a controlled rectifier having a cathode and an anode connected across said pulse transformer and a control terminal connected to said first winding, and a reset voltage source connected to said second winding on said saturable reactor.

References Cited by the Examiner
UNITED STATES PATENTS
3,032,685   5/62   Loomis _____ 315—209

IRVING L. SRAGOW, *Primary Examiner.*